United States Patent [19]
Leon

[11] Patent Number: 5,934,187
[45] Date of Patent: Aug. 10, 1999

[54] MARINADE APPLICATOR

[76] Inventor: Wayne M. Leon, 7833 Blaine Rd., Blaine, Wash. 98230

[21] Appl. No.: 09/208,435

[22] Filed: Dec. 10, 1998

Related U.S. Application Data

[60] Provisional application No. 60/073,545, Feb. 3, 1998.

[51] Int. Cl.⁶ .............. A47J 37/10; A47J 43/16; A23L 1/31; A23L 3/34
[52] U.S. Cl. ................ 99/516; 99/532; 99/535; 99/345
[58] Field of Search .............. 99/532–535, 516, 99/345–347; 452/146; 417/341; D7/670, 683

[56] References Cited

U.S. PATENT DOCUMENTS

| | | |
|---|---|---|
| 3,441,980 | 5/1969 | Defenbaugh . |
| 3,483,810 | 12/1969 | Peters et al. ................. 99/532 |
| 3,530,785 | 9/1970 | Peters et al. ................. 99/532 |
| 3,581,651 | 6/1971 | Johnson . |
| 3,611,476 | 10/1971 | Clifton . |
| 3,661,072 | 5/1972 | Allinquant et al. ........... 99/532 |
| 3,762,307 | 10/1973 | Badovinac . |
| 3,777,655 | 12/1973 | Ainsworth ................... 99/532 |
| 4,129,066 | 12/1978 | Corley ......................... 99/345 |
| 4,178,660 | 12/1979 | Olney et al. . |
| 4,331,071 | 5/1982 | Niccolls ..................... 99/535 X |
| 4,774,879 | 10/1988 | Roedel ...................... 99/535 X |
| 5,289,762 | 3/1994 | Phillips ....................... 99/495 |
| 5,593,346 | 1/1997 | Washington . |

*Primary Examiner*—Timothy F. Simone
*Attorney, Agent, or Firm*—Richard C. Litman

[57] ABSTRACT

A marinade applicator having a substantially cylindrical container for various liquid seasonings or marinades. The container has a cylindrical top opening for accommodating a screw-on-top having a plurality of needles or prongs attached thereto. The prongs have hollow cavities or channels for delivering marinade to a meat product. A plurality of conically-shaped tips are centrally attached to the prongs by a recessed planar base which forms a cavity within the cone. At least one concave hole is defined just above the point of attachment to the planar base and within the walls of the cavity to provide marinade to a meat product without clogging. The plurality of conically-shaped tips produce concave impression within a meat product for retaining a marinade of choice.

10 Claims, 2 Drawing Sheets

MARINADE APPLICATOR

CROSS-REFERENCE TO RELATED APPLICATION

This application claims the benefit of U.S. Provisional Patent Application Ser. No. 60/073,545, filed Feb. 3, 1998.

BACKGROUND OF THE INVENTION

1. Field of the Invention

The present invention relates generally to a meat tenderizer. More specifically, the invention is a marinade applicator for mechanically and chemically treating or marinading foods such as meats, fish, and poultry.

2. Description of Related Art

Various meat tenderizers have been devised for mechanically tenderizing foods such as meats, fish or poultry in order to exude the finer qualities from the respective foods according to a desired taste and texture preference.

For centuries, marinade connoisseurs or enthusiasts from many different ethnic and cultural backgrounds have desired to provide a quick and simple way to improve the finer palatable qualities of certain foods by using mechanical and chemical tenderizing methods during the seasoning of foods via marinades. However, most conventional devices for tenderizing foods are either limited to only mechanical methods or suffer mechanical problems such as clogged applicators which occur as a result of meat fibers being lodged within the device, and subsequently prevent the effective use of marinades or liquid seasonings in meats.

Consequently, marinade connoisseurs or enthusiasts often surrender conventional marinade applicators inadequate and succumb to traditional soaking techniques for providing the same intended effect in foods. Although these traditional techniques at least provide the desired taste characteristics which are pleasing to a sampler or marinade enthusiast, such techniques are proven time consuming and quite messy.

For example, U.S. Pat. No. 3,441,980 issued to Defenbaugh discloses a spiral tipped mechanical tenderizer which reduces the natural bulk of the meat by the force of pounding, mashing, cutting and penetrating the meat fibers, tendons, etc. to provide a desired texture for subsequent cooking. There is no teaching, however, for a marinade applicator which provides a dual role of mechanical and chemical tenderizing for obtaining traditional results without the traditional disadvantages described. Other U.S. Patents issued to Clifton (U.S. Pat. No. 3,611,476) and Washington (U.S. Pat. No. 5,593,346) disclose similar meat tenderizers which utilize the mechanical principle of pounding, mashing, etc. as taught by Defenbaugh.

U.S Patents which disclose a combination of liquid flavor injection and mechanical tenderizing are those patents issued to Johnson (U.S. Pat. No. 3,581,651), Allinquant et al. (U.S. Pat. No. 3,661,072), Olney et al. (U.S. Pat. No. 4,178,660) and Badovinac (U.S. Pat. No. 4,178,660). One of particular interest is the patent issued to Johnson (U.S. Pat. No. 3,581,651) which discloses a marinade applicator similar in purpose to that of the instant invention. This device employs a combination handle and reservoir with attached top having a multiplicity of prongs for seasoning and tenderizing meats. The prongs include channels for liquid seasonings, but the channels suffer from the disadvantage of clogging by meat fibers.

U.S. Pat. No. 4,182,002 issued to Holec provides a similar hand-held meat tenderizer which utilizes a plunger to force liquid seasonings through narrow channels embedded within the penetrating head of the device. The device of the instant invention is completely different to that of Holec, and functions without the need of a plunger as taught therein. Another variation of these types of tenderizers is described by U.S. Pat. No. 5,012,728 issued to Langlen et al. which discloses a complex machine having an injection needle assembly which utilizes an automated valve member for injecting fluid such as brine into a meat product.

The marinade applicator of the instant invention is different from the prior and related art in that it is a hand-held marinade applicator which is quick and simple to use and does not require electrical power requirements.

While most conventional meat tenderizers are either solely mechanical or combined mechanical and chemical tenderizing devices, a quick and simple marinade applicator as in the instant invention for tenderizing and seasoning foods without clogging is neither taught nor suggested in the related art. Thus, none of the above inventions and patents, taken either singly or in combination, is seen to describe the instant invention as claimed.

SUMMARY OF THE INVENTION

The marinade applicator according to the invention has a substantially cylindrical container with a combination handle for holding various liquid seasonings or marinades. The container has a circular top opening for accommodating a screw-on top having a plurality of needles or prongs attached thereto. The prongs have hollow cavities or channels for delivering marinade to a meat product from the container. A plurality of substantially conically-shaped tips are provided having a planar base defining a recess or depression. Each tip is concentrically attached to a prong by its planar base, thus forming an annual trough or cavity about each prong. At least one concave hole is defined just above the point of attachment to the planar base, the hole disposed within the walls of the cavity or trough. The trough or cavity is thus allowed to fill with marinade while the tips below are used to mechanically tenderize the meat, and thereby permit the marinade to flow over the tip into the meat, thereby eliminating the risk of the tip from clogging. The tip is preferably blunt for developing concave impressions within a selected meat for retaining a desired marinade therein.

Accordingly, it is a principal object of the invention to provide a marinade applicator which delivers marinade uninhibited to a meat product.

It is another object of the invention to provide a marinade applicator which is light-weight, portable and durable.

It is a further object of the invention to provide a marinade applicator which provides the effects of traditional marinading techniques without extended periods of marinading.

Still another object of the invention is to provide a marinade applicator which is quick and simple to use.

It is an object of the invention to provide improved elements and arrangements thereof in the marinade applicator for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is directed to a marinade applicator for marinading foods such as meats, fish and poultry. A preferred embodiment of the present invention is depicted in FIG. 1, and is generally referenced by numeral 3.

Figure 1:
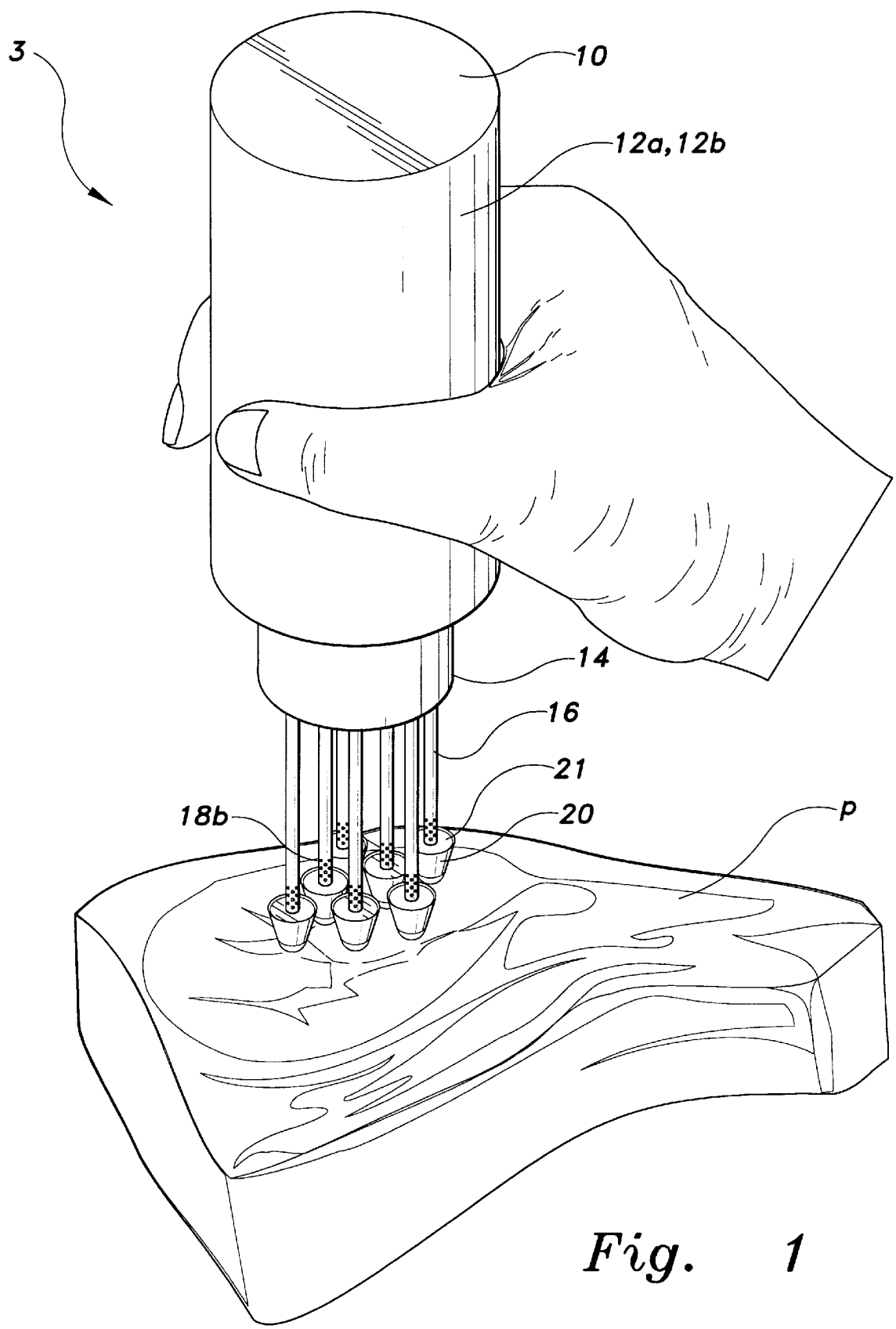
FIG. 1 is an environmental, perspective view of the marinade applicator according to the invention.
Figure 2:
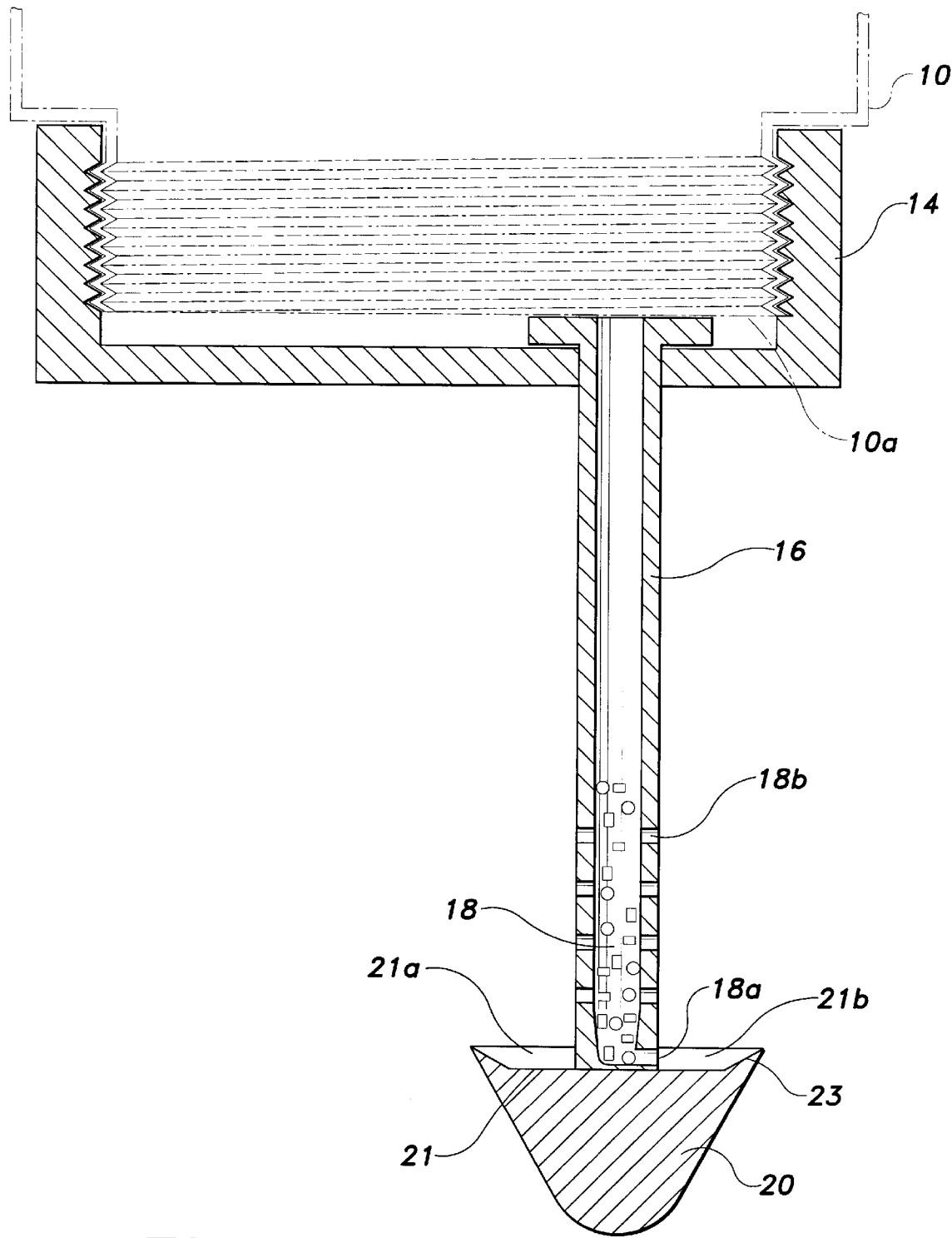
FIG. 2 is a cross-sectional view of the top of the marinade applicator according to the invention, illustrating a single stem or prong with marinade channel and blunt tip.

As best seen in FIGS. 1 and 2, the marinade applicator 3 for seasoning and tenderizing foods such as meats, fish, and poultry comprises a substantially cylindrical container 10, the primary portion being a combination squeezable handle 12a and reservoir 12b for respectively permitting a user to manually squeeze and hold the container 10 and for containing the liquid seasonings therein. As best shown in FIG. 2, the container 10 further comprises a threaded cylindrical open end 10a closable by screw-on top 14. The cylindrical open end 10a has a diameter smaller than the diameter of the container 10 for accommodating screw-on top 14.

The top 14 for the open end 10a of the container 10 is specially designed as a single unit, having at least one prong 16 attached thereto, as schematically illustrated in FIG. 2. The prong 16 according to the preferred embodiment has a hollow tapered channel 18 for delivering liquid seasoning to a meat product via hole 18a.

The stem or prong 16 is attached to a solid conically-shaped blunt tip 20 which has a planar-circular surface 21 defining a recess or annular trough about the prong 16. The recessed surface 21 forms an inverted frusto-conical cavity or trough bounded by a ring or wall 21a.

When the tip 20 penetrates the meat product P to mechanically tenderize the meat, it provides a concave impression within the fibers of the meat product P for flow of a desired marinade into the meat. The surface tension of the liquid marinade overflowing from the trough causes the marinade to flow down the sides of the tip 20 and into the product P. The wall 21a also provides a barrier between and around the hole 18a from the meat product P to minimize clogging.

Alternatively describing the same embodiment, the tip 20 of the preferred embodiment includes a recessed planar-circular surface 21 which forms an inverted frusto-conical shaped cavity 21b within the tip 20 having a wall 23 peripheral to and concentric with the prong 16. The channel 18 of the prong 16 leads to a substantially parabollically shaped hole 18a as recited above, and is disposed within a top surface of the prong 16 at a depth within a central portion of the cavity 21b and below the wall 23 of the conically-shaped tip 20.

Any number or variety of methods can be used to secure the prongs 16 to the screw-on top 14. Current methods include metallic bonding, wedge insertion, projection molding, mechanical fasteners, etc. The preferred method of producing the integrated top 14 of the instant invention as single unit is the method of metallic bonding, especially when the device is intended for use in small restaurant businesses or industrial cafeterias or centers which provide special meals for group retreats. In this type of environment, the marinade applicator 3 according to the invention is made to be quite durable, but yet light weight for extensive use. In the case of personal use in the home, projection molding is the preferred method of making the marinade applicator 3 according to the invention, because such methods include the use of hard plastics which are easy to handle and can be made according to a specific color scheme for aesthetic appeal in many kitchens.

FIG. 1 shows an environmental view of the instant invention wherein a plurality of prongs 16 are provided and used to tenderize. Depending on the desired texture required by the marinade connoisseur or enthusiast, the number of prongs 16 can be increased or decreased accordingly. One of the advantages of the marinade applicator 3 of the instant invention is that multiple screw-on-tops 14 can be made, each having a different number of prongs 16, to permit interchanging with the marinade container as a matter of personal preference.

The prongs 16 according to the preferred embodiment also include a plurality of through holes 18b for providing an additional amount of marinade to the meat product P as desired, which has provided excellent results in the texture of the meat, depending on the type and thickness of the particular meat product P used. The plurality of through holes 18b are disposed along the respective prongs 16 and arranged above the wall 23. The surface area of the through holes 18b is smaller than the surface area of the parabolic shaped hole 18a for controlling the flow of marinade concentration to a specific area of the meat product P.

While there are many materials to choose from in making the device of the instant invention, the preferred materials are stainless steel, soft and hard plastic material depending on the environment of application as recited above. Other advantages of the marinade applicator 3 according to the invention are that the containers of the invention can be made to depict certain labels, emblems, etc. according to personal preference.

It is to be understood that the present invention is not limited to the sole embodiment described above, but encompasses any and all embodiments within the scope of the following claims.

I claim:

1. A marinade applicator for seasoning and tenderizing foods such as meats, fish, and poultry comprising:

a substantially cylindrical container having a combination handle and reservoir for liquid seasonings, said container comprising a threaded cylindrical, open end for accommodating a screw-on top, wherein said open end has a diameter smaller than the diameter of the container;

said screw-on top for the open end of the container includes at least one prong having a hollow tapered channel centrally attached to a solid conically-shaped tip for penetrating foods, said tip comprises a recessed planar-circular surface which forms an inverted frusto-conically shaped cavity having a wall peripheral to and concentric with said prong;

the channel leading to a substantially parabolically shaped hole disposed within a top surface of the prong at a depth within a central portion of the cavity and below the wall of the conically-shaped tip.

2. The marinade applicator according to claim 1, wherein said prong includes a plurality of through holes along its length and disposed above said wall.

3. The marinade applicator according to claim 2, wherein each of said plurality of through holes has a diameter substantially smaller than the diameter of the parabolic shaped hole.

4. The marinade applicator according to claim 1, wherein said screw-on top and at least one prong is an integral unit.

5. The marinade applicator according to claim 4, wherein said single unit is made of stainless steel.

6. The marinade applicator according to claim 4, wherein said single unit is made of a soft plastic material.

7. The marinade applicator according to claim 1, wherein said container is made of stainless steel.

8. The marinade applicator according to claim 1, wherein said container is made of a hard plastic material.

9. The marinade applicator according to claim 1, wherein said tip is a blunt tip.

10. A marinade applicator for seasoning and tenderizing foods such as meats, fish, and poultry comprising:

a substantially cylindrical container having a combination handle and reservoir for liquid seasonings, said container comprising a threaded cylindrical, open end for accommodating a screw-on top, wherein said open end has a diameter smaller than the diameter of the container;

said screw-on top for the open end of the container includes at least one prong having a plurality of through holes, said at least one prong having a hollow tapered channel centrally attached to a solid conically-shaped tip for penetrating foods, said tip comprises a recessed planar-circular surface which forms an inverted frusto-conically shaped cavity having a wall peripheral to and concentric with said prong;

the channel leading to a substantially parabolically shaped hole disposed within a top surface of the prong at a depth within a central portion of the cavity and below the wall of the conically-shaped tip, and each of said plurality of through holes has a diameter substantially smaller than the diameter of the parabolic shaped hole.

* * * * *